Nov. 25, 1958     M. K. AWEDISSJAN     2,861,458
VIBRATION GENERATOR
Filed Sept. 16, 1955
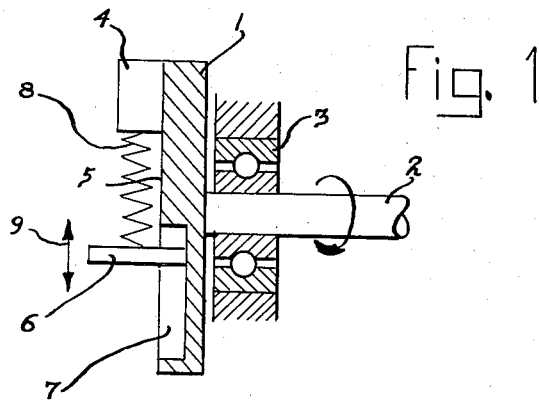
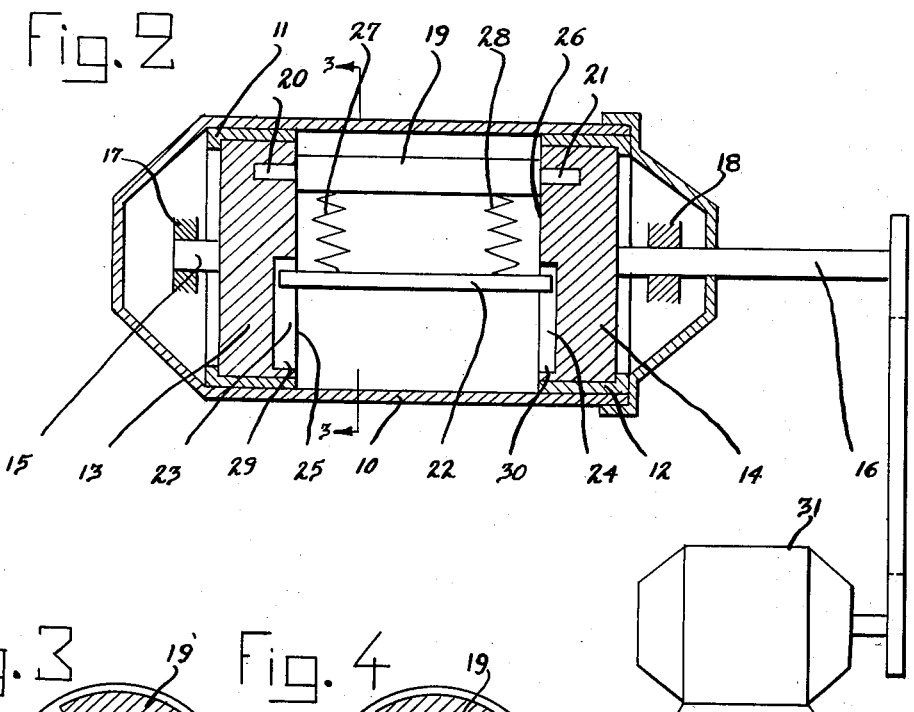
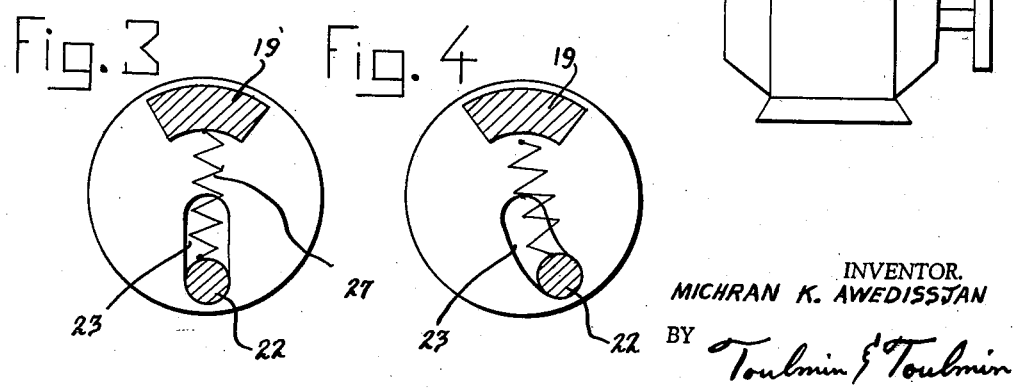
INVENTOR.
MICHRAN K. AWEDISSJAN
BY Toulmin & Toulmin
ATTORNEYS

United States Patent Office 2,861,458
Patented Nov. 25, 1958

2,861,458

VIBRATION GENERATOR

Michran K. Awedissjan, Reading, Pa.

Application September 16, 1955, Serial No. 534,722

7 Claims. (Cl. 74—87)

This invention relates to an oscillator having a rotor for bearing two balancing members. It relates in particular to the type of oscillators wherein two balancing members are automatically adjustable relative to each other due to the effect of centrifugal forces acting against the spring forces of resilient members, so that the center of gravity of the rotating system approaches the central axis of the rotor with increasing number of revolutions.

In the hitherto known oscillators two levers are mounted in the rotor symmetrically to the central axis of the latter, equal out of balance masses being provided at the far ends of each lever.

One or several springs exert a force upon the levers which causes the out-of-balance masses to adopt positions near one another when the rotor is standing still or rotating slowly, the unbalances adding up in this case.

As the speed of the rotor increases, the centrifugal forces acting upon the out-of-balance masses cause the levers to be swiveled about the same angle in opposite direction against the spring forces of the resilient members. Thereby the center of gravity of the rotating system approaches the rotation axis while maintaining the oscillating amplitude generated by the rotating system independent from speed within wide limits.

In the oscillators known in the art it is furthermore required that the levers bearing the out-of-balance masses are always swung by equal angles away from their initial position. This controlled motion of both levers is achieved by an additional transmission gear drive.

It is also known to construct oscillators having a rotor and one single displaceable out-of-balance mass which is displaced relative to the rotor by the action of centrifugal forces against a spring force. However, in the known oscillators of this latter type the center of gravity of the rotating system moves away from the rotating axis at increasing speed thereby determining the unbalance of the rotating system.

It is an object of my invention to provide an oscillator of the same effectiveness as the known types, but of substantially simpler construction.

It is another object of my invention to provide a novel type of oscillators which is particularly easy to mount in other apparatus for the control of which the oscillator is to be used.

It is yet another object of the invention to provide an oscillator having a rotor and one single displaceable out-of-balance mass, the displacement of which causes the center of gravity of the rotating system to approach the rotating axis with increasing speed, thereby decreasing the unbalance of the system.

The aforesaid objects are attained according to my invention by providing an oscillator having a rotor and two out-of-balance masses, one of which is rigidly connected to the rotor.

The other out-of-balance mass provided in the oscillator according to my invention is further displaceable relative to the out-of-balance mass rigidly connected with the rotor.

This has the advantage that no transmission gear drive for controlling the movement of the two out-of-balance masses relative to each other is required which is the case in the known apparatus. Furthermore the rotor bearing the out-of-balance masses is provided with at least one cylindrical running surface or tread, and the whole rotation system is arranged within a cylinder surface having the diameter of the aforesaid tread and being coaxial with the latter, said cylindrical surface thereby completely enclosing the entire rotation system.

In the oscillator according to my invention spring means are provided for holding the displaceable out-of-balance masses in a determined position relative to the out-of-balance mass which is rigidly connected to the rotor means, when the system is standing still. With increasing speed the displaceable member has moved away from the rigidly connected member thereby displacing the center of gravity towards the rotor axis of the system and decreasing the unbalance of the latter.

The output of a motor driven vibration generator having out-of-balance members is determined by the centrifugal forces generated by the apparatus.

It is often desirable to vary the number of revolutions per minute of the vibrator which is achieved in the vibrators known in the art by maintaining the amplitude of oscillation constant and to change centrifugal forces in proportion to the square of the speed ratio.

None of these measures offers any advantage. If the known vibrator is equipped with interchangeable out-of-balance masses in order to achieve this purpose the vibrator must be brought to a standstill in order to change the parts, which makes it impossible to determine the optional number of revolutions in a rapid and reliable manner.

In order to avoid accidents a vibrator of the above type must be dimensioned for maximum speed and for the maximum out-of-balance mass. This requires an extremely heavy apparatus presenting considerable difficulties in designing the bearings.

In contrast thereto, the new vibrator combines the advantage of easy application to maximum safety. In comparison with other vibrators showing these advantages the vibrator according to the invention is of a particularly simple and inexpensive construction.

The several objects and advantages referred to above will become more apparent upon reference to the accompanying drawing in which:

Figure 1 is a longitudinal cross-section of an embodiment of the oscillator according to my invention;

Figure 2 is a longitudinal section of another embodiment of the oscillator according to the invention;

Figure 3 is a cross-section along line 3—3 in Figure 2;

Figure 4 is a cross-section similar to that of Figure 3 but showing a somewhat different embodiment of the elongated grooves for guiding the displaceable unbalanced member.

Referring now to the drawings more in detail and in particular to Figure 1, reference character 1 indicates a rotor which is rotatably mounted on a shaft 2 supported in bearing 3. The disc-shaped rotor bears near its periphery the unbalanced member 4. On the disc surface 5 the displaceable unbalanced member 6 is guided in a groove 7 provided in the surface 5 of the rotor 1. The unbalanced member 6 is resiliently connected to the rigidly attached unbalanced member 4 by means of a spring 8 and is displaceable in the groove 7 in the direction of the arrow at 9, depending on the increased or decreased speed of shaft 2.

Referring now more particularly to Figure 2, reference numeral 10 indicates a casing, wherein there are mounted two annular bearings 11, 12.

Rotor means consisting of the discs 13 and 14, are rotatively arranged inside the inner annular surface of the bearings 11, 12, and are mounted on shafts 15, 16 which are supported rotatably in shaft bearings 17, 18.

An out-of-balance mass 19 is rigidly connected with disks 13, 14 forming the rotor means, for instance, with aid of studs 20, 21 inserted and keylocked in corresponding recesses of the disks 13, 14.

A second out-of-balance mass 22 is provided parallel to the out-of-balance mass 19 and with its two ends inserted displaceably in radial direction with regard to the disks 13, 14 in elongated grooves 23, 24 provided in the circular faces 25, 26 of the discs 13, 14.

These elongated grooves extend from the center of rotation of the discs 13, 14 towards the opposite rim portion of the discs.

The grooves 23, 24 may be straight as shown in Figure 3, or curved as in Figure 4.

Spring means 27, 38 are mounted each with one end on the out-of-balance mass 19 and with their opposite end on the displaceable out-of-balance mass 22, thereby holding the latter at a predetermined distance relative to the former when the system is standing still, which original position of mass 22 is in vicinity of the rotation axis of the rotor means 13, 14.

The end position of mass 22, attained when the system is rotating at full speed, is in the ends 29, 30 of grooves 23, 24 opposite the rigid mass 19.

The system is driven, for instance, by a motor 31 acting on shaft 16.

The unbalance of the rotating system is greatest when the system is standing still and the displaceable out-of-balance mass 22 is in its starting position. With increasing speed the mass 22 will move gradually against the spring forces of resilient members 27, 28 until the spring forces are in equilibrium with the centrifugal forces acting upon the rotating mass 22. Corresponding to the displacement of mass 22, the distance of the center of gravity of the system from the rotation axis of the latter decreases and correspondingly also the unbalance of the rotating system. In the present embodiment the unbalance disappears when the system rotates at speeds sufficiently high to cause the out-of-balance mass 22 to adopt its end position at 29, 30 in grooves 23, 24.

Within a certain range the alternating load transmitted to the casing 10 can be independent from the speed. The limits of this range may be determined and/or changed by a correspondent selection of the spring characteristics of the resilient members 27, 28, as well as by the type of paths along which mass 22 is caused to travel relative to the rotating rotor means.

The vibrator according to the invention can be used to advantage wherever a medium is to be condensed, distributed, or mixed by means of vibrations. Experience has taught that the number of revolutions and the amplitude of the vibration play a decisive part in such processes.

The optimal number of revolutions is usually determined and adjusted at will during operation while the amplitude of oscillation is adjusted automatically.

The vibrator according to the invention is of particular advantage when used for testing structural parts such as parts of airplanes, materials, and oscillating apparatus.

It will be understood that this invention is susceptible to modification in order to adapt it to different usages and conditions and, accordingly, it is desired to comprehend such modifications within this invention as may fall within the scope of the appended claims.

What is claimed is:

1. In an oscillator, a casing, a pair of spaced discs rotatably mounted therein and coaxially disposed, first out-of-balance means eccentrically mounted between and connecting said discs, second out-of-balance means mounted between said discs for radial movement therebetween, and non-linear means urging said second out-of-balance means toward said first out-of-balance means.

2. In an oscillator for providing a constant centrifugal force over a range of speed, a casing, a pair of rotatably mounted supporting members coaxially disposed therein, an elongated member rigidly and eccentrically connecting said supporting members, a second elongated member carried between said supporting members and adapted for radial movement therebetween, and means urging non-linearly said second elongated member toward said first elongated member.

3. In an oscillator for providing a constant centrifugal force over a range of speed, a casing, a pair of rotatably mounted supporting members coaxially disposed therein, an elongated unbalancing member rigidly and eccentrically connecting said supporting members, said supporting members having radially extending grooves on the cooperating faces thereof, a second elongated member slidably mounted in said grooves between said supporting members, and means for urging said second elongated member toward said first elongated member.

4. An oscillator of the kind described in claim 3, wherein said second elongated member is substantially parallel to said first elongated member.

5. In an oscillator for providing a constant centrifugal force over a range of speed, a casing, a pair of rotatably mounted supporting members coaxially disposed therein, an elongated member rigidly and eccentrically connecting said supporting members, a second elongated member carried between said supporting members for radial movement therebetween, and resilient means interconnecting said elongated members and urging said second elongated member toward said first elongated member.

6. In an oscillator, a cylinder casing, a pair of annular bearing surfaces spaced within said casing, a pair of discs rotatably mounted within said bearing means and coaxially disposed on the longitudinal axis of said casing, a first elongated member rigidly connecting said discs, said discs having parallel radially extending grooves on the cooperating faces thereof, a second elongated member having each end thereof slidably mounted in said grooves, said second elongated member being substantially parallel to said first elongated member, and spring means interconnecting said elongated members and urging said members together.

7. An article of manufacture comprising in an oscillator, a casing, a pair of rotatably mounted supporting members coaxially disposed therein, an elongated member rigidly connecting said supporting members, a second elongated member carried between said supporting members and adapted for radial movement therebetween, and means urging said second longated member toward said first elongated member.

References Cited in the file of this patent

UNITED STATES PATENTS

| | | |
|---|---|---|
| 1,076,472 | Wilkinson | Oct. 21, 1913 |
| 2,192,420 | Stroud | Mar. 5, 1940 |
| 2,687,718 | Britton | Aug. 31, 1954 |
| 2,771,279 | Dearden | Nov. 20, 1956 |